United States Patent
Ugurlu et al.

(10) Patent No.: US 10,932,250 B2
(45) Date of Patent: Feb. 23, 2021

(54) METHOD AND APPARATUS FOR ENHANCING TIME DOMAIN-RESOURCE ALLOCATION FRAMEWORK IN MOBILE COMMUNICATIONS

(71) Applicant: MediaTek Singapore Pte. Ltd., Singapore (SG)

(72) Inventors: Ahmet Umut Ugurlu, Cambridge (GB); Abdellatif Salah, Cambridge (GB); Mohammed S Aleabe Al-Imari, Cambridge (GB); Raghavendra Madanahally Ramakrishna, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 0 days.

(21) Appl. No.: 16/445,190

(22) Filed: Jun. 18, 2019

(65) Prior Publication Data
US 2019/0387506 A1  Dec. 19, 2019

Related U.S. Application Data

(60) Provisional application No. 62/686,737, filed on Jun. 19, 2018.

(51) Int. Cl.
*H04W 72/04*  (2009.01)
*H04W 72/00*  (2009.01)

(52) U.S. Cl.
CPC ....... *H04W 72/042* (2013.01); *H04W 72/005* (2013.01); *H04W 72/0446* (2013.01)

(58) Field of Classification Search
CPC ... H04L 1/1893; H04L 5/0091; H04L 5/0044; H04L 5/0007; H04L 5/0053; H04L 1/0028; H04W 72/042; H04W 72/005; H04W 72/0446; H04W 72/0406; H04W 72/1278
See application file for complete search history.

(56) References Cited

U.S. PATENT DOCUMENTS

2014/0036801 A1  2/2014  Malladi et al.
2019/0349941 A1*  11/2019  Yang ............... H04L 1/1893

OTHER PUBLICATIONS

China National Intellectual Property Administration, International Search Report and Written Opinion for International Patent Application No. PCT/CN2019/091883, dated Sep. 10, 2019.
Huawei et al., Remaining issues on resource allocation and TBS, 3GPP TSG RAN WG1 Meeting #92, R1-1801343, Athens, Greece, Feb. 26-Mar. 2, 2018.

* cited by examiner

*Primary Examiner* — Vinncelas Louis
(74) *Attorney, Agent, or Firm* — Han IP PLLC; Andy M. Han

(57) ABSTRACT

Various solutions for enhancing time domain-resource allocation (TD-RA) framework with respect to user equipment and network apparatus in mobile communications are described. An apparatus may receive an indication of a reference point. The apparatus may determine a start symbol position according to the reference point rather than a slot boundary. The apparatus may determining a TD-RA according to the start symbol position. The apparatus may perform a transmission according to the TD-RA.

10 Claims, 3 Drawing Sheets

METHOD AND APPARATUS FOR ENHANCING TIME DOMAIN-RESOURCE ALLOCATION FRAMEWORK IN MOBILE COMMUNICATIONS

CROSS REFERENCE TO RELATED PATENT APPLICATION(S)

The present disclosure is part of a non-provisional application claiming the priority benefit of U.S. patent application Ser. No. 62/686,737, filed on 19 Jun. 2018, the content of which is incorporated by reference in its entirety.

TECHNICAL FIELD

The present disclosure is generally related to mobile communications and, more particularly, to enhancing time domain-resource allocation (TD-RA) framework with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), ultra-reliable and low latency communications (URLLC) is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ block error rate (BLER).

A user equipment (UE) shall determine resource block assignments in time domain using the resource assignment field in detected physical downlink control channel (PDCCH) downlink control information (DCI). The time domain resource assignment field of the DCI provides scheduling parameters including a slot offset (e.g., K0/K2), a start symbol position and a duration to be applied in a transmission. In current NR TD-RA framework, only slot boundaries can be used as a reference point. This is insufficient for the strict latency requirements of URLLC services. The starting symbol position in a TD-RA configuration is configured and/or interpreted by a UE based on a reference point. However, the transmissions of URLLC services should be more instantaneous for reducing latency. Thus, a reference point for determining a TD-RA should be more flexible.

In addition, current NR TD-RA framework does not allow data scheduling across a slot boundary. A transmission grant can only be scheduled within a slot. This is not efficient in time domain distribution and will also cause latency issues for URLLC transmissions. The current TD-RA framework is not sufficient for low-latency services.

Furthermore, some of the fields of the normal DCI are not applicable or does not make sense for the high latency sensitive transmissions. For example, the RRC-configured TD-RA table length has an impact on the DCI payload size. Reliability of the DCI depends on the size. The smaller the size of DCI is, the better the reliability may be given that the transmission resources are same due to the lower coding gain. Using normal DCI for the same reliability may need to increase the aggregation level, which has the drawback of blocking probability. Besides, smaller bandwidth parts may not be able to accommodate higher aggregation levels. Accordingly, compact DCI design is needed by the fact that the normal DCI size is large and inefficient for the URLLC transmissions. Small DCI size is important for reliability of control channel for some service types and hence more compact RRC-configured TD-RA tables are necessary.

Accordingly, how to enhance TD-RA framework for different service types may become an important issue for supporting multiple service types in the newly developed wireless communication network. Therefore, it is needed to provide proper schemes to enhance TD-RA framework and configurations for low-latency services.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to enhancing TD-RA framework with respect to user equipment and network apparatus in mobile communications.

In one aspect, a method may involve an apparatus receiving an indication of a reference point. The method may also involve the apparatus determining a start symbol position according to the reference point rather than a slot boundary. The method may further involve the apparatus determining a TD-RA according to the start symbol position. The method may further involve the apparatus performing a transmission according to the TD-RA.

In one aspect, a method may involve an apparatus receiving a configuration of a TD-RA from a network node. The method may also involve the apparatus determining whether a predetermined condition is satisfied. The method may further involve the apparatus determining the TD-RA across a slot boundary in an event that the predetermined condition is satisfied. The method may further involve the apparatus performing a transmission according to the TD-RA across the slot boundary.

In one aspect, an apparatus may comprise a transceiver capable of wirelessly communicating with a network node of a wireless network. The apparatus may also comprise a processor communicatively coupled to the transceiver. The processor may be capable of receiving, via the transceiver, an indication of a reference point. The processor may also be capable of determining a start symbol position according to the reference point rather than a slot boundary. The processor may further be capable of determining a time domain-resource allocation (TD-RA) according to the start symbol position. The processor may further be capable of performing, via the transceiver, a transmission according to the TD-RA.

In one aspect, an apparatus may comprise a transceiver capable of wirelessly communicating with a network node of a wireless network. The apparatus may also comprise a processor communicatively coupled to the transceiver. The processor may be capable of receiving, via the transceiver, a configuration of a TD-RA from a network node. The processor may also be capable of determining whether a predetermined condition is satisfied. The processor may further be capable of determining the TD-RA across a slot boundary in an event that the predetermined condition is satisfied. The processor may further be capable of performing, via the transceiver, a transmission according to the TD-RA across the slot boundary.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
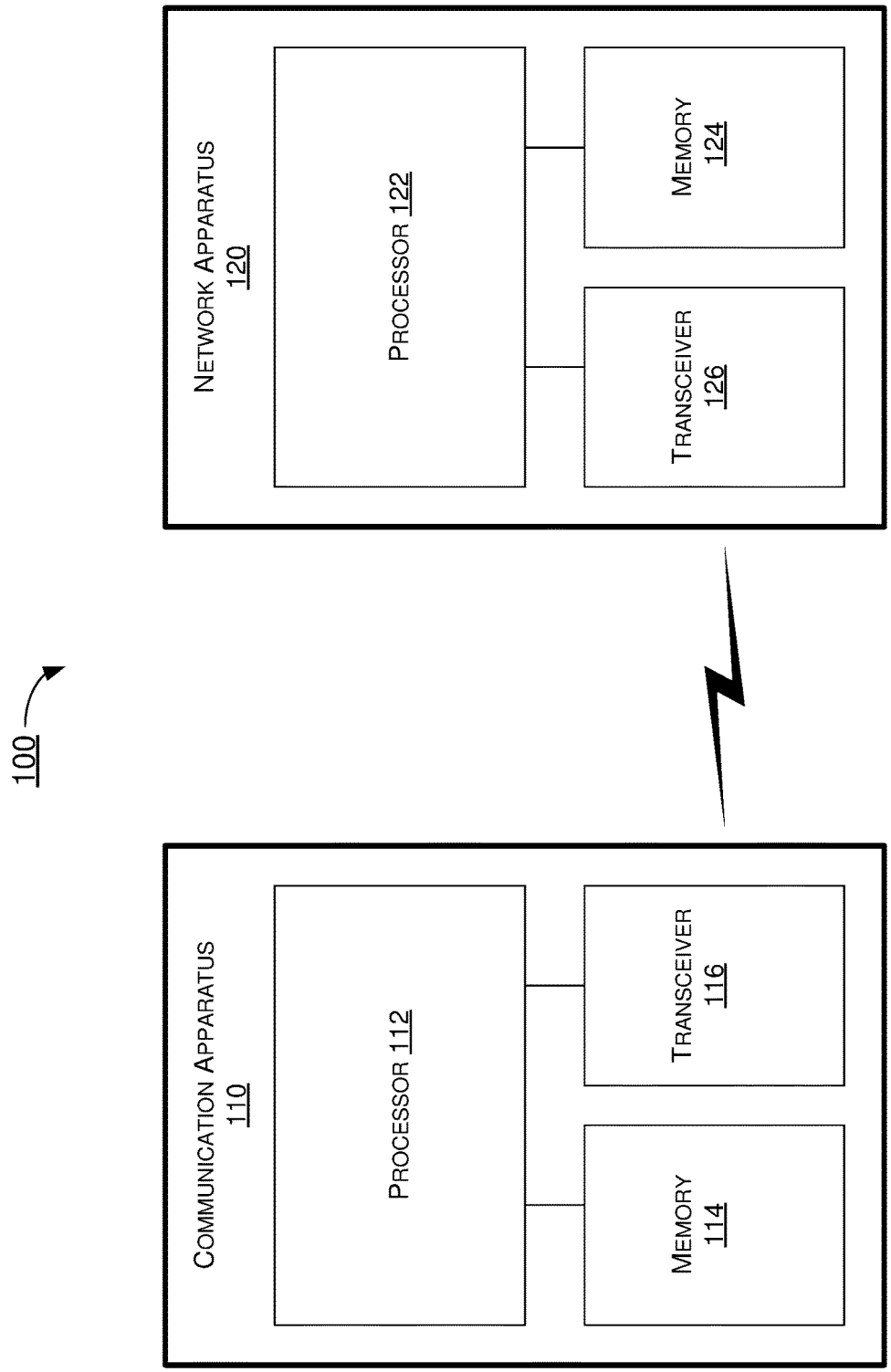
FIG. 1 is a block diagram of an example communication apparatus and an example network apparatus in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhancing TD-RA framework with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, URLLC is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER.

A UE shall determine resource block assignments in time domain using the resource assignment field in detected PDCCH DCI. The time domain resource assignment field of the DCI provides scheduling parameters including a slot offset (e.g., K0/K2), a start symbol position and a duration to be applied in a transmission. In current NR TD-RA framework, only slot boundaries can be used as a reference point. This is insufficient for the strict latency requirements of URLLC services. The starting symbol position in a TD-RA configuration is configured and/or interpreted by a UE based on a reference point. However, the transmissions of URLLC services should be more instantaneous for reducing latency. Thus, a reference point for determining a TD-RA should be more flexible.

In addition, current NR TD-RA framework does not allow data scheduling across a slot boundary. A transmission grant (e.g., a transport block) can only be scheduled within a slot. This is not efficient in time domain distribution and will also cause latency issues for URLLC transmissions. The current TD-RA framework is not sufficient for low-latency services (e.g., URLLC services).

Furthermore, some of the fields of the normal DCI are not applicable or does not make sense for the high latency sensitive transmissions. For example, the RRC-configured TD-RA table length has an impact on the DCI payload size. Reliability of the DCI depends on the size. The smaller the size of DCI is, the better the reliability may be given that the transmission resources are same due to the lower coding gain. Using normal DCI for the same reliability may need to increase the aggregation level, which has the drawback of blocking probability. Besides, smaller bandwidth parts may not be able to accommodate higher aggregation levels. Accordingly, compact DCI design is needed by the fact that the normal DCI size is large and inefficient for the URLLC transmissions. Small DCI size is important for reliability of control channel for some service types and hence more compact RRC-configured TD-RA tables are necessary.

In view of the above, the present disclosure proposes a number of schemes pertaining to enhancing/improving TD-RA framework with respect to the UE and the network apparatus. According to the schemes of the present disclosure, the starting symbol position in a TD-RA configuration may be configured and/or interpreted by the UE based on a reference point. The dynamic scheduling grant may be configured without a TD-RA information field in DCI to reduce DCI payload size. The UE may be expected to perform a transmission across a slot boundary. With such design, the strict low-latency and high-reliability requirements may be satisfied. The UE may be able to support URLLC-only service and/or both eMBB and URLLC services simultaneously.

To enhance current TD-RA configuration and framework, three example schemes are proposed in accordance with implementations of the present disclosure. In the first scheme, the reference point for determining the start symbol position for URLLC services may be changed rather than a slot boundary. Specifically, the UE may be configured to receive an indication of a reference point. The UE may be configured to determine a start symbol position according to the reference point rather than a slot boundary. The UE may determine a TD-RA according to the start symbol position. The UE may performing a transmission according to the TD-RA. The transmission may comprise an uplink transmission and/or a downlink transmission.

In some implementations, the reference point may be defined as a half-slot. For example, in NR, the half-slot may correspond to 7 symbols (e.g., orthogonal frequency-division multiplexing (OFDM) symbols) with normal cyclic prefix (CP) and 6 symbols with extended CP. The UE may be configured to use a half-slot boundary instead of a slot boundary as a reference point for determining a start symbol indexing in a TD-RA table.

In some implementations, the reference point may comprise a reference time-domain region/window. The reference time-domain region/window may comprise a predetermined number of symbols (e.g., 4 symbols or 7 symbols). Either one value or one value from multiple possible values may be configured to the UE. The configuration may be specified in $3^{rd}$ Generation Partnership Project (3GPP) specifications or signaled via a higher layer signaling (e.g., radio resource control (RRC) signaling) and/or a physical layer signaling (e.g., DCI).

In some implementations, the reference point may comprise a time position of a control signal. The time/frequency position of another physical channel, reference signal (RS), control information may be used as the reference point. For example, the first or the last symbol of a configured control signal may be used as a reference point. The control signal may comprise, for example and without limitation, a control-resource set (CORESET), a search space, DCI, uplink control information (UCI) and so on. The determination of the reference point may also involve an offset parameter or an offset value. The UE may be configured to determine the reference point according to the offset parameter/value. The offset may be specified in 3GPP specifications, or configured to the UE by a higher layer signaling (e.g., RRC signaling) and/or a physical layer signaling (e.g., DCI).

In some implementations, the time-domain reference region/window may be determined from the reference starting point till the end of the current slot. Alternatively, the time-domain reference region/window may comprise a fixed time duration. The fixed time duration may be specified in 3GPP specifications, or configured to the UE by a higher layer signaling (e.g., RRC signaling) and/or a physical layer signaling (e.g., DCI). Alternatively, the time-domain reference region/window may be determined from one reference starting point till the next reference starting point. For example, the time-domain reference region/window may be determined in the time duration between each successive monitoring occasion of a periodic CORESET configuration.

In the second scheme, the time domain resource allocation bit-field from the DCI may be removed to have a more compact DCI. It is desirable to use a scheduling DCI for URLLC with small payload size. The payload size may be reduced in an event that the TD-RA field is not needed or can be omitted. The TD-RA configuration may be provided by other methods than a TD-RA field in DCI. The dynamic scheduling grant may be configured without a TD-RA information field to reduce DCI payload size and the missing information may be provided by other means such as a reference window, or some reference points in time-domain. The implementations described in the first scheme may be applied to the second scheme. For example, data may be scheduled back to back after the CORESET. The UE may determine the starting symbol position as the symbol following the last symbol of the CORESET. The length of the data may be signalled via RRC configuration or layer 1 signalling. In another example, data may be scheduled after the scheduling DCI with an offset. The UE may determine the starting symbol position as the symbol after an offset following the last symbol of the CORESET. The length of the data may be signalled via RRC configuration or layer 1 signalling.

In the third scheme, the UE may be configured to support cross slot scheduling for a transmission. The transmission may comprise a downlink transmission (e.g., physical downlink shared channel (PDSCH)) and/or an uplink transmission (e.g., physical uplink shared channel (PUSCH)). For example, the UE may be able to receive/transmit the PDSCH/PUSCH across a slot boundary. Either the current NR TD-RA table may be used or any of the enhancements to TD-RA configuration/framework may be used with PDSCH/PUSCH resource assignments across slot boundaries. The K0 and/or K2 parameter may be used to indicate the first slot where the starting symbol of the resource assignment is located.

Specifically, the UE may be configured to receive a configuration of a TD-RA from the network node. The UE may determine the TD-RA across a slot boundary according to the configuration. Alternatively, the UE may be configured to determine whether a predetermined condition is satisfied. The UE may determine the TD-RA across a slot boundary in an event that the predetermined condition is satisfied. The UE may perform a transmission according to the TD-RA across the slot boundary.

In some implementations, the predetermined condition may comprise that a maximum duration of the TD-RA is not greater than a predetermined number of symbols (e.g., X symbols). For example, X may be defined as a fixed integer (e.g., 14 symbols) in 3GPP specifications. Alternatively, X may be configurable by a higher layer signaling (e.g., RRC signaling) and/or a physical layer signaling (e.g., DCI) from the network node. The UE may be able to determine the TD-RA across slot boundary in an event that the maximum duration of the TD-RA is not greater than X symbols.

In some implementations, the predetermined condition may comprise that a scheduled physical data channel is located in a predetermined number of slots. For example, Y may be defined as a fixed integer (e.g., Y=2 slots) in 3GPP specifications. Alternatively, Y may be configurable by a higher layer signaling (e.g., RRC signaling) and/or a physical layer signaling (e.g., DCI) from the network node. The UE may be able to determine the TD-RA across slot boundary in an event that the scheduled physical data channel is located in a maximum of Y slots.

In some implementations, the predetermined condition may comprise that a duration of the TD-RA is greater than a threshold value (e.g., T parameter). For example, T can be defined as a fixed integer (e.g., 14 symbols) in 3GPP specifications. Alternatively, T may be configurable by a higher layer signaling (e.g., RRC signaling) and/or a physical layer signaling (e.g., DCI) from the network node. The starting symbol position may be denoted by S (e.g., $0 \leq S \leq 13$). The duration of the TD-RA may be denoted by L. In an event that $L > 13-S$, the TD-RA across slot boundary may be used. The decision may be determined based on the criterion $13-S > T$. For example, the UE may be configured to determine whether $L > 13-S$ is true. In an event that $L > 13-S$ is true, the UE may be configured to determine whether 13−S>T is true. In an event that 13−S>T is true, the UE may be configured to determine that the TD-RA across slot boundary is allowed. In an event that 13−S>T is false, the UE may be configured to determine that the TD-RA across slot boundary is not allowed. In an event that L>13−S is false, the UE may be configured to determine that the TD-RA across slot boundary is not allowed. The UE may be able to determine the TD-RA across slot boundary in an event that the additionally incurred delay without across-slot-boundary assignment is greater than a threshold T parameter.

In some implementations, the predetermined condition may comprise a required UE capability. The TD-RA across slot boundary may be allowed in an event that the UE capability can support. For example, the X or Y parameter cannot be greater than some maximum supported values by the UE. The UE capability may be determined based on the capability of a UE's extended buffering. More than one value may be configured for the X or Y parameter. For example, a baseline value and an aggressive value may be defined. In another example, multiple values may be configured for the X or Y parameter. Multiple values may be configured based on per serving cell, per bandwidth part (BWP), or per numerology (e.g., subcarrier spacing).

Illustrative Implementations

FIG. 1 illustrates an example communication apparatus 110 and an example network apparatus 120 in accordance with an implementation of the present disclosure. Each of communication apparatus 110 and network apparatus 120 may perform various functions to implement schemes, techniques, processes and methods described herein pertaining to enhancing TD-RA framework with respect to user equipment and network apparatus in wireless communications, including schemes described above as well as processes 200 and 300 described below.

Communication apparatus 110 may be a part of an electronic apparatus, which may be a UE such as a portable or mobile apparatus, a wearable apparatus, a wireless communication apparatus or a computing apparatus. For instance, communication apparatus 110 may be implemented in a smartphone, a smartwatch, a personal digital assistant, a digital camera, or a computing equipment such as a tablet computer, a laptop computer or a notebook computer. Communication apparatus 110 may also be a part of a machine type apparatus, which may be an IoT or NB-IoT apparatus such as an immobile or a stationary apparatus, a home apparatus, a wire communication apparatus or a computing apparatus. For instance, communication apparatus 110 may be implemented in a smart thermostat, a smart fridge, a smart door lock, a wireless speaker or a home control center. Alternatively, communication apparatus 110 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 110 may include at least some of those components shown in FIG. 1 such as a processor 112, for example. Communication apparatus 110 may further include one or more other components not pertinent to the proposed scheme of the present disclosure (e.g., internal power supply, display device and/or user interface device), and, thus, such component(s) of communication apparatus 110 are neither shown in FIG. 1 nor described below in the interest of simplicity and brevity.

Network apparatus 120 may be a part of an electronic apparatus, which may be a network node such as a base station, a small cell, a router or a gateway. For instance, network apparatus 120 may be implemented in an eNodeB in an LTE, LTE-Advanced or LTE-Advanced Pro network or in a gNB in a 5G, NR, IoT or NB-IoT network. Alternatively, network apparatus 120 may be implemented in the form of one or more IC chips such as, for example and without limitation, one or more single-core processors, one or more multi-core processors, or one or more RISC or CISC processors. Network apparatus 120 may include at least some of those components shown in FIG. 1 such as a processor 122, for example. Network apparatus 120 may further include one or more other components not pertinent to the proposed scheme of the present disclosure (e.g., internal power supply, display device and/or user interface device), and, thus, such component(s) of network apparatus 120 are neither shown in FIG. 1 nor described below in the interest of simplicity and brevity.

In one aspect, each of processor 112 and processor 122 may be implemented in the form of one or more single-core processors, one or more multi-core processors, or one or more RISC or CISC processors. That is, even though a singular term "a processor" is used herein to refer to processor 112 and processor 122, each of processor 112 and processor 122 may include multiple processors in some implementations and a single processor in other implementations in accordance with the present disclosure. In another aspect, each of processor 112 and processor 122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 112 and processor 122 is a special-purpose machine specifically designed, arranged and configured to perform specific tasks including power consumption reduction in a device (e.g., as represented by communication apparatus 110) and a network (e.g., as represented by network apparatus 120) in accordance with various implementations of the present disclosure.

In some implementations, communication apparatus 110 may also include a transceiver 116 coupled to processor 112 and capable of wirelessly transmitting and receiving data. In some implementations, communication apparatus 110 may further include a memory 114 coupled to processor 112 and capable of being accessed by processor 112 and storing data therein. In some implementations, network apparatus 120 may also include a transceiver 126 coupled to processor 122 and capable of wirelessly transmitting and receiving data. In some implementations, network apparatus 120 may further include a memory 124 coupled to processor 122 and capable of being accessed by processor 122 and storing data therein. Accordingly, communication apparatus 110 and network apparatus 120 may wirelessly communicate with each other via transceiver 116 and transceiver 126, respectively. To aid better understanding, the following description of the operations, functionalities and capabilities of each of communication apparatus 110 and network apparatus 120 is provided in the context of a mobile communication environment in which communication apparatus 110 is implemented in or as a communication apparatus or a UE and network apparatus 120 is implemented in or as a network node of a communication network.

In some implementations, the reference point for determining the start symbol position for URLLC services may be changed by processor 112 and/or 122 rather than a slot boundary. Specifically, processor 112 may be configured to receive, via transceiver 126, an indication of a reference point. Processor 112 may be configured to determine a start symbol position according to the reference point rather than a slot boundary. Processor 112 may determine a TD-RA according to the start symbol position. Processor 112 may performing a transmission according to the TD-RA.

In some implementations, processor 112 and/or 122 may use a half-slot as the reference point. For example, in NR, the half-slot may correspond to 7 symbols (e.g., OFDM symbols) with normal CP and 6 symbols with extended CP. Processor 112 may be configured to use a half-slot boundary instead of a slot boundary as a reference point for determining a start symbol indexing in a TD-RA table.

In some implementations, processor 112 and/or 122 may use a reference time-domain region/window as the reference point. The reference time-domain region/window may comprise a predetermined number of symbols (e.g., 4 symbols or 7 symbols). Either one value or one value from multiple possible values may be configured to processor 112. The configuration may be stored in memory 114 or received via a higher layer signaling (e.g., RRC signaling) and/or a physical layer signaling (e.g., DCI).

In some implementations, the reference point may comprise a time position of a control signal. Processor 112 and/or 122 may use the time/frequency position of another physical channel, RS, control information as the reference point. For example, processor 112 and/or 122 may use the first or the last symbol of a configured control signal as a reference point. The control signal may comprise, for example and without limitation, a CORESET, a search space, DCI, UCI and so on. The determination of the reference point may also involve an offset parameter or an offset value. Processor 112 may be configured to determine the reference point according to the offset parameter/value. The offset may be stored in memory 114, or received via a higher layer signaling (e.g., RRC signaling) and/or a physical layer signaling (e.g., DCI).

In some implementations, processor 112 may determine the time-domain reference region/window from the reference starting point till the end of the current slot. Alternatively, the time-domain reference region/window may comprise a fixed time duration. The fixed time duration may be stored in memory 114, or configured to processor 112 by a higher layer signaling (e.g., RRC signaling) and/or a physical layer signaling (e.g., DCI). Alternatively, processor 112 may determine the time-domain reference region/window from one reference starting point till the next reference starting point. For example, processor 112 may determine the time-domain reference region/window in the time duration between each successive monitoring occasion of a periodic CORESET configuration.

In some implementations, the time domain resource allocation bit-field from the DCI may be removed to have a more compact DCI. The TD-RA configuration may be provided by other methods than a TD-RA field in DCI. The dynamic scheduling grant may be configured without a TD-RA information field to reduce DCI payload size and the missing information may be provided by other means such as a reference window, or some reference points in time-domain. For example, data may be scheduled back to back after the CORESET. Processor 112 may determine the starting symbol position as the symbol following the last symbol of the CORESET. Processor 122 may signal the length of the data via RRC configuration or layer 1 signalling. In another example, processor 122 may schedule data after the scheduling DCI with an offset. Processor 112 may determine the starting symbol position as the symbol after an offset following the last symbol of the CORESET. Processor 122 may signal the length of the data via RRC configuration or layer 1 signalling.

In some implementations, processor 112 may be configured to support cross slot scheduling for a transmission. The transmission may comprise a downlink transmission (e.g., PDSCH) and/or an uplink transmission (e.g., PUSCH). For example, processor 112 may be able to receive/transmit, via transceiver 116, the PDSCH/PUSCH across a slot boundary. Either the current NR TD-RA table may be used or any of the enhancements to TD-RA configuration/framework may be used with PDSCH/PUSCH resource assignments across slot boundaries. Processor 122 may use the K0 and/or K2 parameter to indicate the first slot where the starting symbol of the resource assignment is located.

In some implementations, processor 112 may be configured to receive, via transceiver 116, a configuration of a TD-RA from network apparatus 120. Processor 112 may determine the TD-RA across a slot boundary according to the configuration. Alternatively, processor 112 may be configured to determine whether a predetermined condition is satisfied. Processor 112 may determine the TD-RA across a slot boundary in an event that the predetermined condition is satisfied. Processor 112 may perform a transmission according to the TD-RA across the slot boundary.

In some implementations, the predetermined condition may comprise that a maximum duration of the TD-RA is not greater than a predetermined number of symbols (e.g., X symbols). For example, X may be defined as a fixed integer (e.g., 14 symbols) in 3GPP specifications. Alternatively, X may be configurable by a higher layer signaling (e.g., RRC signaling) and/or a physical layer signaling (e.g., DCI) from network apparatus 120. Processor 112 may be able to determine the TD-RA across slot boundary in an event that the maximum duration of the TD-RA is not greater than X symbols.

In some implementations, the predetermined condition may comprise that a scheduled physical data channel is located in a predetermined number of slots. For example, Y may be defined as a fixed integer (e.g., Y=2 slots) in 3GPP specifications. Alternatively, Y may be configurable by a higher layer signaling (e.g., RRC signaling) and/or a physical layer signaling (e.g., DCI) from network apparatus 120. Processor 112 may be able to determine the TD-RA across slot boundary in an event that the scheduled physical data channel is located in a maximum of Y slots.

In some implementations, the predetermined condition may comprise that a duration of the TD-RA is greater than a threshold value (e.g., T parameter). For example, T can be defined as a fixed integer (e.g., 14 symbols) in 3GPP specifications. Alternatively, T may be configurable by a higher layer signaling (e.g., RRC signaling) and/or a physical layer signaling (e.g., DCI) from network apparatus 120. The starting symbol position may be denoted by S (e.g., 0≤S≤13). The duration of the TD-RA may be denoted by L. In an event that L>13−S, processor 112 may use the TD-RA across slot boundary. The decision may be determined based on the criterion 13−S>T. For example, processor 112 may be configured to determine whether L>13−S is true. In an event that L>13−S is true, processor 112 may be configured to determine whether 13−S>T is true. In an event that 13−S>T is true, processor 112 may be configured to determine that the TD-RA across slot boundary is allowed. In an event that 13−S>T is false, processor 112 may be configured to determine that the TD-RA across slot boundary is not allowed. In an event that L>13−S is false, processor 112 may be configured to determine that the TD-RA across slot boundary is not allowed. Processor 112 may be able to determine the TD-RA across slot boundary in an event that the additionally incurred delay without across-slot-boundary assignment is greater than a threshold T parameter.

Illustrative Processes

Figure 2:
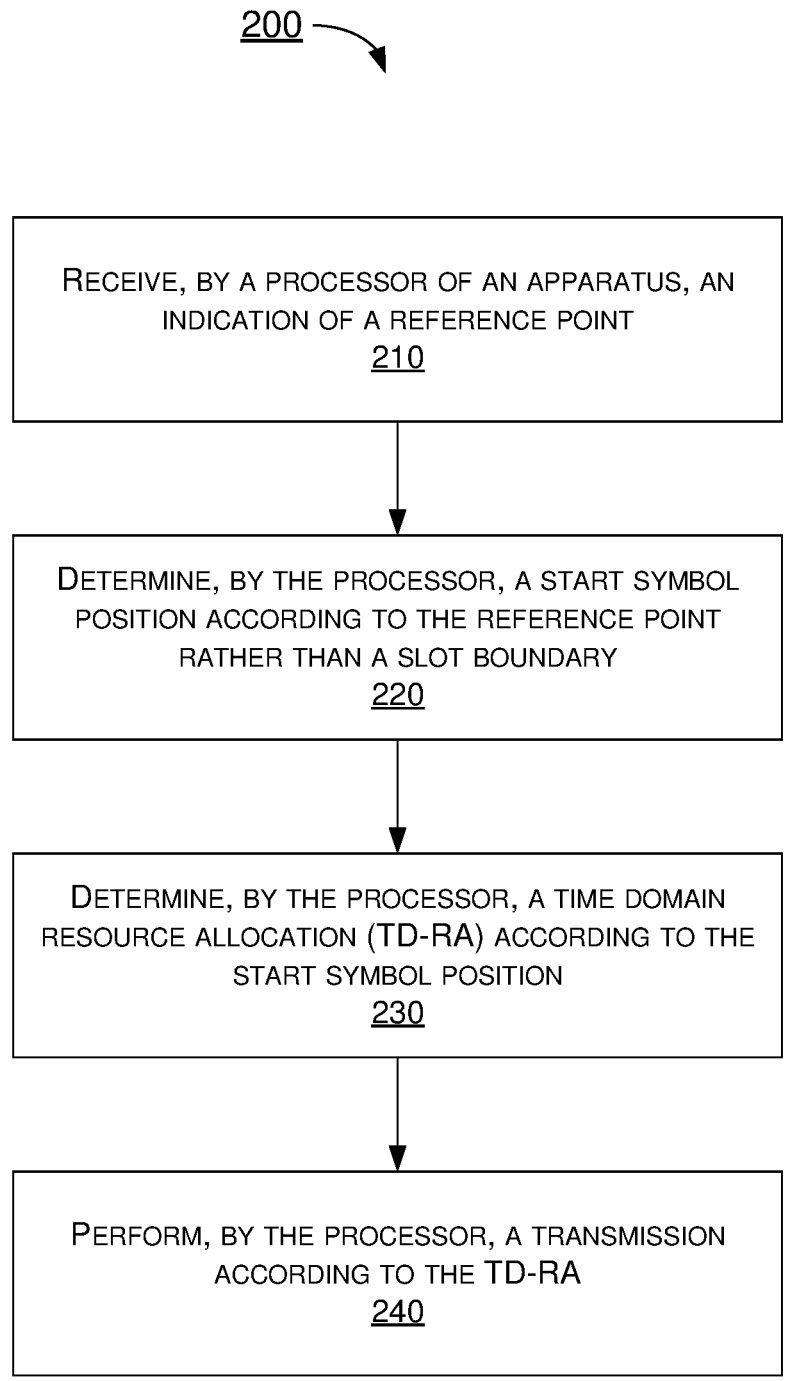
FIG. 2 is a flowchart of an example process in accordance with an implementation of the present disclosure.

FIG. 2 illustrates an example process 200 in accordance with an implementation of the present disclosure. Process 200 may be an example implementation of above scenarios, whether partially or completely, with respect to enhancing TD-RA framework with the present disclosure. Process 200 may represent an aspect of implementation of features of communication apparatus 110. Process 200 may include one or more operations, actions, or functions as illustrated by one or more of blocks 210, 220, 230 and 240. Although illustrated as discrete blocks, various blocks of process 200 may be divided into additional blocks, combined into fewer blocks, or eliminated, depending on the desired implementation. Moreover, the blocks of process 200 may executed in the order shown in FIG. 2 or, alternatively, in a different order. Process 200 may be implemented by communication apparatus 110 or any suitable UE or machine type devices. Solely for illustrative purposes and without limitation, process 200 is described below in the context of communication apparatus 110. Process 200 may begin at block 210.

At 210, process 200 may involve processor 112 of apparatus 110 receiving an indication of a reference point. Process 200 may proceed from 210 to 220.

At 220, process 200 may involve processor 112 determining a start symbol position according to the reference point rather than a slot boundary. Process 200 may proceed from 220 to 230.

At 230, process 200 may involve processor 112 determining a TD-RA according to the start symbol position. Process 200 may proceed from 230 to 240.

At 240, process 200 may involve processor 112 performing a transmission according to the TD-RA.

In some implementations, the reference point may comprise a half-slot boundary.

In some implementations, the reference point may comprise a reference time-domain region. The reference time-domain region may comprise a predetermined number of symbols.

In some implementations, the reference point may comprise a time position of a control signal. The control signal may comprise, for example and without limitation, a CORESET, a search space, DCI, UCI and so on.

In some implementations, process 200 may involve processor 112 determining the TD-RA without a TD-RA information field in DCI.

Figure 3:
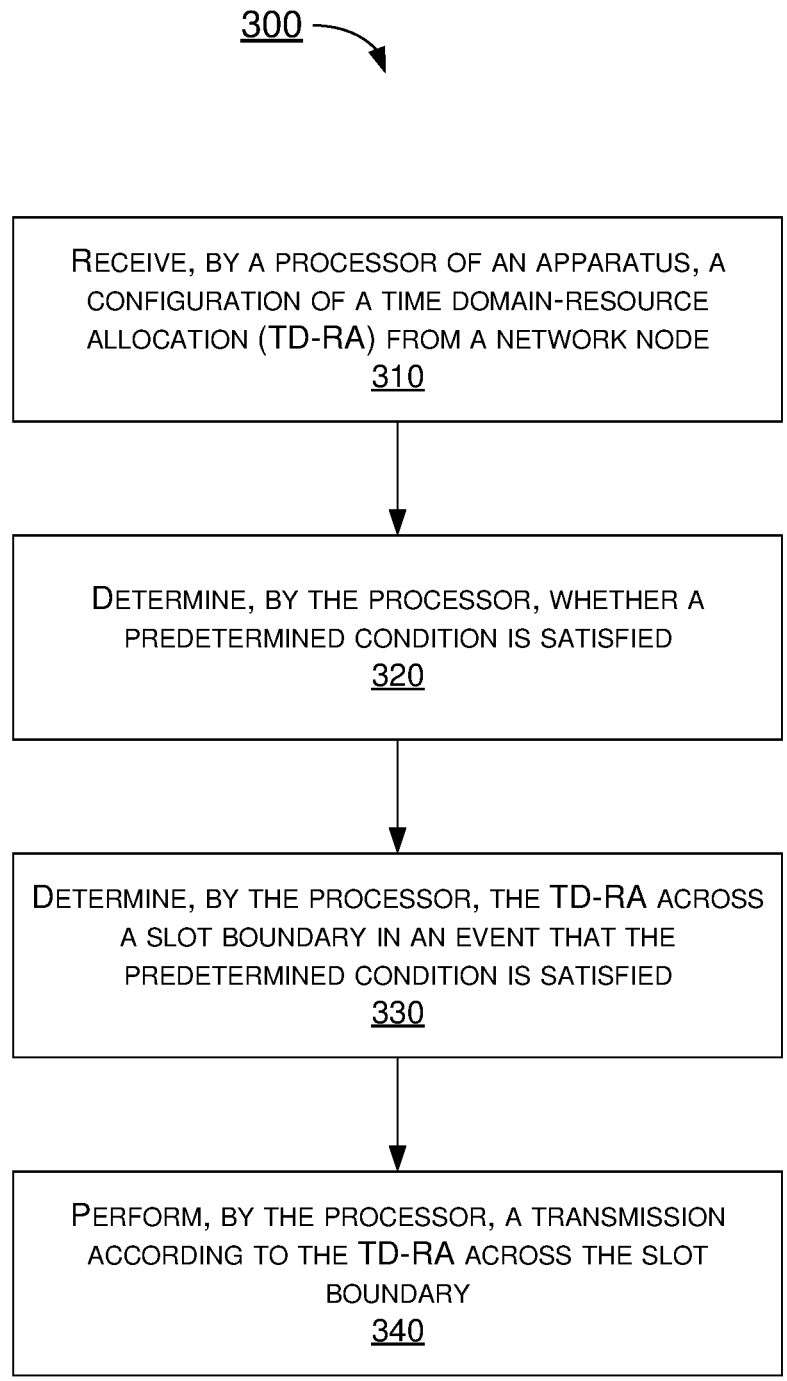
FIG. 3 is a flowchart of an example process in accordance with an implementation of the present disclosure.

FIG. 3 illustrates an example process 300 in accordance with an implementation of the present disclosure. Process 300 may be an example implementation of above scenarios, whether partially or completely, with respect to enhancing TD-RA framework with the present disclosure. Process 300 may represent an aspect of implementation of features of communication apparatus 110. Process 300 may include one or more operations, actions, or functions as illustrated by one or more of blocks 310, 320, 330 and 340. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 110 or any suitable UE or machine type devices. Solely for illustrative purposes and without limitation, process 300 is described below in the context of communication apparatus 110. Process 300 may begin at block 310.

At 310, process 300 may involve processor 112 of apparatus 110 receiving a configuration of a TD-RA from a network node. Process 300 may proceed from 310 to 320.

At 320, process 300 may involve processor 112 determining whether a predetermined condition is satisfied. Process 300 may proceed from 320 to 330.

At 330, process 300 may involve processor 112 determining the TD-RA across a slot boundary in an event that the predetermined condition is satisfied. Process 300 may proceed from 330 to 340.

At 340, process 300 may involve processor 112 performing a transmission according to the TD-RA across the slot boundary.

In some implementations, the predetermined condition may comprise that a maximum duration of the TD-RA is not greater than a predetermined number of symbols.

In some implementations, the predetermined condition may comprise that a scheduled physical data channel is located in a predetermined number of slots.

In some implementations, the predetermined condition may comprise that a duration of the TD-RA is greater than a threshold value.

In some implementations, the predetermined condition may comprise a required capability.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, an indication of a reference point;
   determining, by the processor, a start symbol position according to the reference point rather than a slot boundary;
   determining, by the processor, a time domain-resource allocation (TD-RA) according to the start symbol position; and
   performing, by the processor, a transmission according to the TD-RA,
   wherein the reference point comprises a half-slot boundary.

2. The method of claim 1, wherein the reference point comprises a reference time-domain region, and wherein the reference time-domain region comprises a predetermined number of symbols.

3. The method of claim 1, wherein the reference point comprises a time position of a control signal.

4. The method of claim 1, wherein the determining of the TD-RA comprises determining the TD-RA without a TD-RA information field in downlink control information (DCI).

5. A method, comprising:
   receiving, by a processor of an apparatus, a configuration of a time domain-resource allocation (TD-RA) from a network node;
   determining, by the processor, whether a predetermined condition is satisfied;
   determining, by the processor, the TD-RA across a slot boundary in an event that the predetermined condition is satisfied; and
   performing, by the processor, a transmission according to the TD-RA across the slot boundary,
   wherein the predetermined condition comprises one of:
     a maximum duration of the TD-RA being not greater than a predetermined number of symbols,
     a scheduled physical data channel being located in a predetermined number of slots,
     a duration of the TD-RA being greater than a threshold value, or
     a required capability.

6. An apparatus, comprising:
   a transceiver capable of wirelessly communicating with a network node of a wireless network; and
   a processor communicatively coupled to the transceiver, the processor capable of:
     receiving, via the transceiver, an indication of a reference point;
     determining a start symbol position according to the reference point rather than a slot boundary;
     determining a time domain-resource allocation (TD-RA) according to the start symbol position; and
     performing, via the transceiver, a transmission according to the TD-RA,
   wherein the reference point comprises a half-slot boundary.

7. The apparatus of claim 6, wherein the reference point comprises a reference time-domain region, and wherein the reference time-domain region comprises a predetermined number of symbols.

8. The apparatus of claim 6, wherein the reference point comprises a time position of a control signal.

9. The apparatus of claim 6, wherein, in determining the TD-RA, the processor is capable of determining the TD-RA without a TD-RA information field in downlink control information (DCI).

10. An apparatus, comprising:
    a transceiver capable of wirelessly communicating with a network node of a wireless network; and
    a processor communicatively coupled to the transceiver, the processor capable of:

receiving, via the transceiver, a configuration of a time domain-resource allocation (TD-RA) from a network node;
determining whether a predetermined condition is satisfied;
determining the TD-RA across a slot boundary in an event that the predetermined condition is satisfied; and
performing, via the transceiver, a transmission according to the TD-RA across the slot boundary,
wherein the predetermined condition comprises one of:
a maximum duration of the TD-RA being not greater than a predetermined number of symbols,
a scheduled physical data channel being located in a predetermined number of slots,
a duration of the TD-RA being greater than a threshold value, or
a required capability.

\* \* \* \* \*